(12) United States Patent
Nishimura et al.

(10) Patent No.: US 8,723,829 B2
(45) Date of Patent: May 13, 2014

(54) TOUCH SENSOR-EQUIPPED DISPLAY DEVICE

(75) Inventors: Tomohiko Nishimura, Osaka (JP); Jin Miyazawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 123 days.

(21) Appl. No.: 13/634,516

(22) PCT Filed: Mar. 3, 2011

(86) PCT No.: PCT/JP2011/054951
§ 371 (c)(1),
(2), (4) Date: Sep. 12, 2012

(87) PCT Pub. No.: WO2011/114900
PCT Pub. Date: Sep. 22, 2011

(65) Prior Publication Data
US 2013/0027338 A1 Jan. 31, 2013

(30) Foreign Application Priority Data
Mar. 17, 2010 (JP) .................................. 2010-061398

(51) Int. Cl.
*G06F 3/041* (2006.01)
(52) U.S. Cl.
USPC ......................................... 345/173; 345/174
(58) Field of Classification Search
CPC ........ G06F 3/044; G06F 3/0412; G06F 3/041
USPC ................................................. 345/173, 174
See application file for complete search history.

(56) References Cited

U.S. PATENT DOCUMENTS

| | | | |
|---|---|---|---|
| 5,606,346 A | 2/1997 | Kai et al. | |
| 5,631,666 A * | 5/1997 | Tagawa et al. | 345/104 |
| 8,243,027 B2 * | 8/2012 | Hotelling et al. | 345/173 |

(Continued)

FOREIGN PATENT DOCUMENTS

| | | |
|---|---|---|
| JP | 06-187096 A | 7/1994 |
| JP | 2006-146895 A | 6/2006 |

OTHER PUBLICATIONS

U.S. Appl. No. 13/634,515, filed on Sep. 12, 2012.

*Primary Examiner* — Lixi C Simpson
(74) *Attorney, Agent, or Firm* — Chen Yoshimura LLP

(57) ABSTRACT

In order to provide a touch sensor-equipped display device that is not susceptible to the effect of noise caused by a polarity reversal in a common voltage of a display device without using special circuitry, the disclosed touch sensor-equipped display device is provided with: a sensor output read circuit 21 that is sequentially connected to a plurality of sensor electrodes of a touch sensor part 7 and that outputs a signal voltage according to the electrical properties of each electrode; a sensor control circuit 23 that supplies a control signal to the sensor output read circuit 21; and a coordinate calculation circuit 22 that detects a contact position on the basis of the signal voltage. The coordinate calculation circuit 22 is provided with: an averaging circuit 221 that calculates the average values of signal voltage values obtained during a scan that was started in synchronization with a horizontal synchronization signal when the common voltage is reversed from positive polarity to negative polarity, and the signal voltage values obtained during a scan that was started in synchronization with a horizontal synchronization signal when the common voltage is reversed from negative polarity to positive polarity; and a contact position detection circuit 222 that detects the contact position on the basis of the average values.

7 Claims, 8 Drawing Sheets

(56) References Cited

U.S. PATENT DOCUMENTS

| | | |
|---|---|---|
| 2007/0262966 A1 | 11/2007 | Nishimura et al. |
| 2010/0212974 A1 * | 8/2010 | Kim .......................... 178/18.03 |
| 2011/0157064 A1 * | 6/2011 | Imai .............................. 345/173 |

* cited by examiner

TOUCH SENSOR-EQUIPPED DISPLAY DEVICE

TECHNICAL FIELD

The present invention relates to a display device provided with a touch sensor that can detect a position where a finger or the like has come into contact.

BACKGROUND ART

Conventionally, touch sensor-equipped display devices provided with a touch sensor (also referred to as a touch panel) on the front surface (viewer side) of a display have been used in various applications. A touch sensor is an input device that makes possible operation commands or data input by detecting the position where a finger, a stylus, or the like has come into contact. In terms of the types of position detection, the capacitance coupling type, the resistive film type, the infrared type, the ultrasonic type, the electromagnetic inductive/coupling type, and the like are known.

When using a touch sensor integrally with a display device, there is a problem that the touch sensor receives noise from the display device resulting in a decrease in the accuracy of position detection. In a case in which the display device uses a liquid crystal panel, for example, common voltage applied to an opposite electrode of the liquid crystal panel causes an induced voltage to occur in the conductive film for position detection of the touch sensor. This induced voltage is a cause for noise.

A configuration for eliminating such noise is disclosed in Japanese Patent Application Laid-Open Publication No. 2006-146895, for example. A touch sensor-equipped display device disclosed in the aforementioned publication is provided with a strobe signal generation circuit and a noise reduction current signal generation circuit. The strobe signal generation circuit generates a strobe signal in synchronization with the period of polarity reversal of the common voltage supplied to the opposite electrode. The noise reduction current signal generation circuit generates a noise reduction current signal, which is obtained by eliminating, based on the strobe signal, prescribed portions from a current flowing from terminals connected to the touch sensor part.

According to this conventional configuration, the noise occurring in an output current of the conductive film for position detection caused by a periodic polarity reversal of the common voltage is eliminated using the strobe signal. As a result, the S/N ratio of the touch sensor output is improved and the accuracy of the position detection is improved.

However, with the above-mentioned conventional configuration, specialized circuits for noise-removal such as the strobe signal generation circuit and the noise reduction current signal generation circuit are needed, resulting in a complex configuration.

SUMMARY OF THE INVENTION

An objective of the present invention is to provide a touch sensor-equipped display device that is not susceptible to the effect of noise resulting from a polarity reversal of the common voltage of the display device without using a strobe signal generation circuit or a noise reduction current signal generation circuit.

In order to achieve the above objective, a touch sensor-equipped display device according to one embodiment of the present invention includes: a display panel that includes an active matrix substrate having a plurality of pixel electrodes formed therein, a display medium layer, and an opposite substrate having an opposite electrode that faces the plurality of pixel electrodes; a display panel driver circuit that supplies a display signal voltage to the plurality of pixel electrodes, the display panel driver circuit also supplying a common voltage, which undergoes a periodic reversal of polarity, to the opposite electrode; a touch sensor part disposed on a surface of the display panel on a side of the opposite substrate, the touch sensor part including a plurality of sensor electrodes that exhibit a change in electrical characteristics when a contacting body comes into contact therewith; a sensor output read circuit that is sequentially connected to the respective sensor electrodes, the sensor output read circuit outputting a signal voltage based on the electrical characteristic of the connected sensor electrode; a sensor control circuit that supplies a control signal to the sensor output read circuit; and a coordinate calculation circuit that detects a position where the contacting body has come into contact in the touch sensor part based on the signal voltage outputted from the sensor output read circuit, wherein the sensor control circuit starts a scanning operation that sequentially connects the each of the sensor electrodes in the touch sensor part to sensor output read circuit to output the signal voltage, in synchronization with a horizontal synchronization signal supplied to the display panel driver circuit, and wherein the coordinate calculation circuit includes: an averaging circuit that calculates an average value between a signal voltage value that is outputted from the sensor output read circuit through the scanning operation started in synchronization with a horizontal synchronization signal at which the common voltage reverses from negative polarity to positive polarity, and a signal voltage value that is outputted from the sensor output read circuit through the scanning operation started in synchronization with a horizontal synchronization signal at which the common voltage reverses from positive polarity to negative polarity; and a coordinate position detection circuit that detects the position where the contacting body has come into contact in the touch sensor part based on the aforementioned average value.

According to the present invention, a touch sensor-equipped display device that is not susceptible to the effect of noise resulting from polarity reversals of the common voltage of the display device without using specialized circuits such as a strobe signal generation circuit or a noise reduction current signal generation circuit can be provided.

DETAILED DESCRIPTION OF EMBODIMENTS

Figure 1:
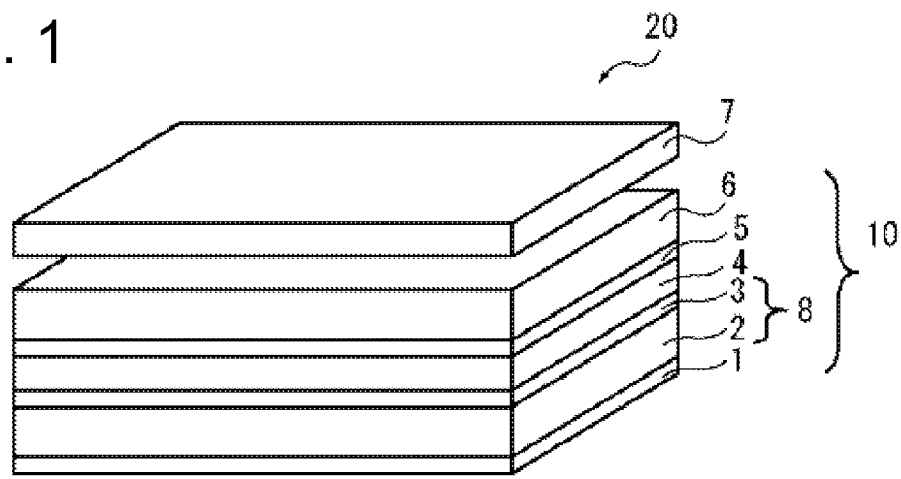
FIG. 1 is a schematic drawing that shows a configuration of a touch sensor-equipped display device according to one embodiment of the present invention.

A touch sensor-equipped display device according to one embodiment of the present invention includes: a display panel that includes an active matrix substrate having a plurality of pixel electrodes formed therein, a display medium layer, and an opposite substrate having an opposite electrode that faces the plurality of pixel electrodes; a display panel driver circuit that supplies a display signal voltage to the plurality of pixel electrodes, the display panel driver circuit also supplying a common voltage, which undergoes a periodic reversal of polarity, to the opposite electrode; a touch sensor part disposed on a surface of the display panel on a side of the opposite substrate, the touch sensor part including a plurality of sensor electrodes that exhibit a change in electrical characteristics when a contacting body comes into contact therewith; a sensor output read circuit that is sequentially connected to the respective sensor electrodes, the sensor output read circuit outputting a signal voltage representing the electrical characteristic of the connected sensor electrode; a sensor control circuit that supplies a control signal to the sensor output read circuit; and a coordinate calculation circuit that detects a position where the contacting body has come into contact in the touch sensor part based on the signal voltage outputted from the sensor output read circuit, wherein the sensor control circuit starts a scanning operation that sequentially connects each of the sensor electrodes in the touch sensor part to the sensor output read circuit to output the signal voltage, in synchronization with a horizontal synchronization signal supplied to the display panel driver circuit, and wherein the coordinate calculation circuit includes: an averaging circuit that calculates an average value between a signal voltage value that is outputted from the sensor output read circuit through the scanning operation started in synchronization with the horizontal synchronization signal at which the common voltage reverses from negative polarity to positive polarity, and a signal voltage value that is outputted from the sensor output read circuit through the scanning operation started in synchronization with a horizontal synchronization signal at which the common voltage reverses from positive polarity to negative polarity; and a coordinate position detection circuit that detects the position where the contacting body has come into contact in the touch sensor part based on the aforementioned average value.

According to this configuration, it is possible to remove noise associated with the polarity reversal of the common voltage without the use of specialized circuits for noise removal. Reasons are as follows. The polarity of the common voltage alternately reverses from negative polarity to positive polarity or from positive polarity to negative polarity, in synchronization with the fall of the horizontal synchronization signal (switching from a high level to a low level). Therefore, the noise included in the signal voltage value outputted from the sensor output read circuit through the scanning operation started in synchronization with the horizontal synchronization signal generated when the common voltage reverses from negative polarity to positive polarity, and the noise included in the signal voltage value outputted from the sensor output read circuit through the scanning operation started in synchronization with the horizontal synchronization signal generated when the common voltage reverses from positive polarity to negative polarity are at opposite polarities. Therefore, by finding the average value between these signal voltage values in the averaging circuit, noise resulting from the polarity reversal of the common voltage can be cancelled out.

Therefore, according to the above configuration, a touch sensor-equipped display device that is not susceptible to the effect of noise originating from the polarity reversal of the common voltage of the display device without the use of specialized circuits such as strobe signal generation circuits or noise reduction current signal generation circuits can be provided.

According to the above configuration, the averaging circuit preferably calculates an average value between a signal voltage value outputted from the sensor output read circuit through the scanning operation started in synchronization with one horizontal synchronization signal, and a signal voltage value outputted from the sensor output read circuit through the scanning operation started in synchronization with an odd numbered horizontal synchronization signal from the aforementioned one horizontal synchronization signal. The averaging circuit may calculate the average value every two periods of the scanning operation or every one period of the scanning operation.

It is preferable for the touch sensor-equipped display device according to the present embodiment to have a configuration, wherein the sensor electrodes include a first sensor electrode group constituted of a plurality of sensor electrodes that are lined up in a first axis direction of coordinates in the touch sensor part, and a second sensor electrode group constituted of a plurality of sensor electrodes that are lined up in a second axis direction of the coordinates in the touch sensor part, and wherein the coordinate calculation circuit determines the first axis direction coordinate of the position where the contacting body has come into contact based on a signal voltage outputted when the sensor output read circuit is connected to a sensor electrode belonging to the first sensor electrode group, and determines the second axis direction coordinate of the position where the contacting body has come into contact based on a signal voltage outputted when the sensor output read circuit is connected to a sensor electrode belonging to the second sensor electrode group.

The touch sensor-equipped display device according to the present embodiment may have a configuration in which the polarity of the common voltage reverses every one horizontal period, or have a configuration in which the polarity of the common voltage reverses every two horizontal periods.

Embodiment 1

An embodiment of the present invention will be described below in detail with reference to the drawings. Parts in the drawings that are the same or correspond to parts already described are assigned the same reference characters, and descriptions thereof will not be repeated.

Figure 2:
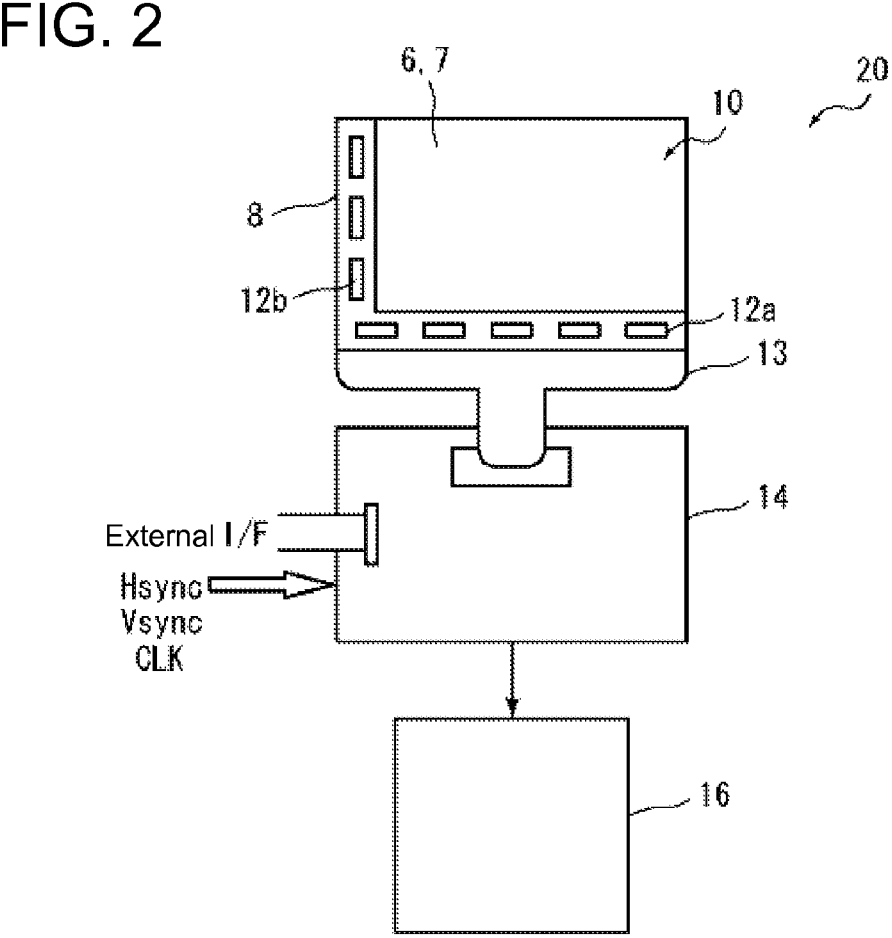
FIG. 2 is a schematic drawing that shows, in particular, the connective relation of the driver circuits and the like, in the configuration of the touch sensor-equipped display device according to Embodiment 1 of the present invention.

FIGS. 1 and 2 are schematic drawings that show the configuration of a touch sensor-equipped display device 20 according to Embodiment 1 of the present invention.

As shown in FIGS. 1 and 2, the touch sensor-equipped display device 20 is provided with an active matrix (a TFT-type, for example) display panel 10, a touch sensor part 7, a driver circuit 14 that supplies various types of signals to the display panel 10, and a touch sensor circuit 16.

The driver circuit 14 is connected to source drivers 12a and gate drivers 12b via an FPC (flexible printed circuit) 13. The source drivers 12a and the gate drivers 12b may be mounted as chips on an active matrix substrate 8 of the display panel 10, or formed monolithically in the active matrix substrate 8.

An image signal, a horizontal synchronization signal $H_{SYNC}$, a vertical synchronization signal $V_{SYNC}$, a clock signal CLK (pixel clock), and the like are inputted to the driver circuit 14 via an external interface (I/F). If the image signal is analog, the clock signal CLK may be generated using a PLL circuit inside the driver circuit 14, for example. The vertical synchronization signal $V_{SYNC}$, the horizontal synchronization signal $H_{SYNC}$ and, as necessary, the clock signal CLK are supplied to the touch sensor circuit 16 either via the driver circuit 14 or directly from the outside.

The display panel 10 has at least the active matrix substrate 8, an opposite substrate 6, and a display medium layer 4 disposed between these substrates.

The active matrix substrate 8 has a TFT array layer 3 that contains switching elements such as TFTs, wiring lines, and the like on a glass substrate 2. The active matrix substrate 8 also has a plurality of pixel electrodes arranged in a matrix form. The display medium layer 4 is a liquid crystal layer, for example. The opposite substrate 6 has a color filter (not shown in drawings) and an opposite electrode 5 formed on the entire surface of the substrate. If the display panel 10 controls the display through polarization using liquid crystals as the display medium layer 4, for example, then the display panel 10 is provided with a polarizing plate on at least one of the surfaces thereof. According to an example of a configuration shown in FIG. 1, a first polarizing plate 1 (polarizing element) is provided on the rear side (opposite to the side viewed by a viewer) of the active matrix substrate 8. Depending on the type of polarization, a second polarizing plate (not shown in drawings) may be provided on the side of the opposite substrate 6 as an analyzer.

According to the above description, the color filter and the second polarizing plate are provided in the display panel 10, but a configuration in which the color filter and the second polarizing plate are disposed on the viewer side of the touch sensor part 7 may be used. Also, besides this, various types of optical members such as a retardation plate and a lens sheet are provided as necessary in the display panel 10.

The touch sensor part 7 is disposed on the front surface (viewer side) of the display panel 10. The touch sensor part 7 has a touch sensor substrate made of a material such as glass or transparent plastic, and transparent conductive films provided on the surface of the touch sensor substrate. The transparent conductive films are formed in a prescribed pattern using a commonly known thin film-forming technique such as the sputtering method, as will be described in detail later. The material for the transparent conductive films is indium tin oxide (ITO), indium zinc oxide (IZO), a tin oxide (NESA), zinc oxide, or the like, for example. In order to have transparent conductive films with excellent thermal resistance and durability, it is preferable for the film to be formed through the sputtering method using a target containing Mg. However, the material and the film-forming method for the transparent conductive films are not particularly limited to the examples disclosed here, and it is possible to use various materials and film-forming methods.

The touch sensor part 7 may be bonded to the surface of the display panel 10 with no gap, using an adhesive or the like, or the touch sensor part 7 may be installed with a gap (air layer). The touch sensor part 7 may be disposed such that the transparent conductive films face the display panel 10, or conversely, such that the touch sensor substrate faces the display panel 10.

Also, the touch sensor part 7 may have a configuration in which the touch sensor substrate is not provided. In this case, the touch sensor part 7 can be realized by directly forming the transparent conductive films on the outer surface of the display panel 10 on the viewer side. This configuration has the advantage that the total thickness of the touch sensor-equipped display device can be made small.

Whether or not a touch sensor substrate is provided in the touch sensor part 7, it is preferable for a protective layer to be formed on the topmost surface on the viewer side. For the protective layer, an inorganic thin film such as $SiO_2$ or $SiNO_x$, a coating film made of a transparent resin, a transparent resin film such as PET or TAC, or the like can be used, for example. In addition, anti-reflective processing and/or anti-contamination processing may be conducted as necessary to the touch sensor part 7.

In the present embodiment, an active matrix (TFT, for example) liquid crystal display panel is used for the display panel 10. In the display panel 10, the polarity of the common voltage supplied to the opposite electrode 5 of the opposite substrate 6 reverses once per certain period (one horizontal synchronization period, for example). This is in order to prevent a direct current voltage from being applied to the liquid crystal layer serving as the display medium layer 4 and to reduce the breakdown voltage required of the gate driver and the source driver.

Figure 3:
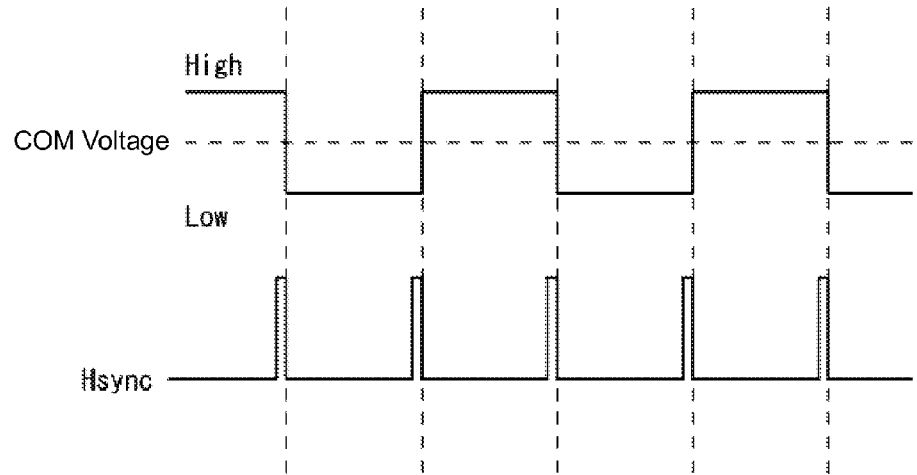
FIG. 3 is a drawing that shows one example of variation over time of a common voltage (COM voltage) applied to an opposite electrode of a display panel.

FIG. 3 is a drawing that shows one example of variation over time of the common voltage (COM voltage) applied to the opposite electrode 5 of the display panel 10. The example in FIG. 3 is the so-called line inversion driving that reverses the polarity (positive and negative) of the common voltage every horizontal synchronization period. However, the present invention is not limited to this, and can also be applied to the so-called two-line inversion driving in which the polarity of the common voltage reverses every two horizontal synchronization periods, or the like. Also, FIG. 3 shows, as an example, a waveform of the common voltage in which the absolute value of the common voltage at positive polarity and the absolute value of the common voltage at negative polarity are equal. However, in the case of a TFT-type liquid crystal panel, for example, the absolute value of the common voltage at positive polarity does not necessarily have to be equal to the absolute value of the common voltage at negative polarity.

Figure 7:
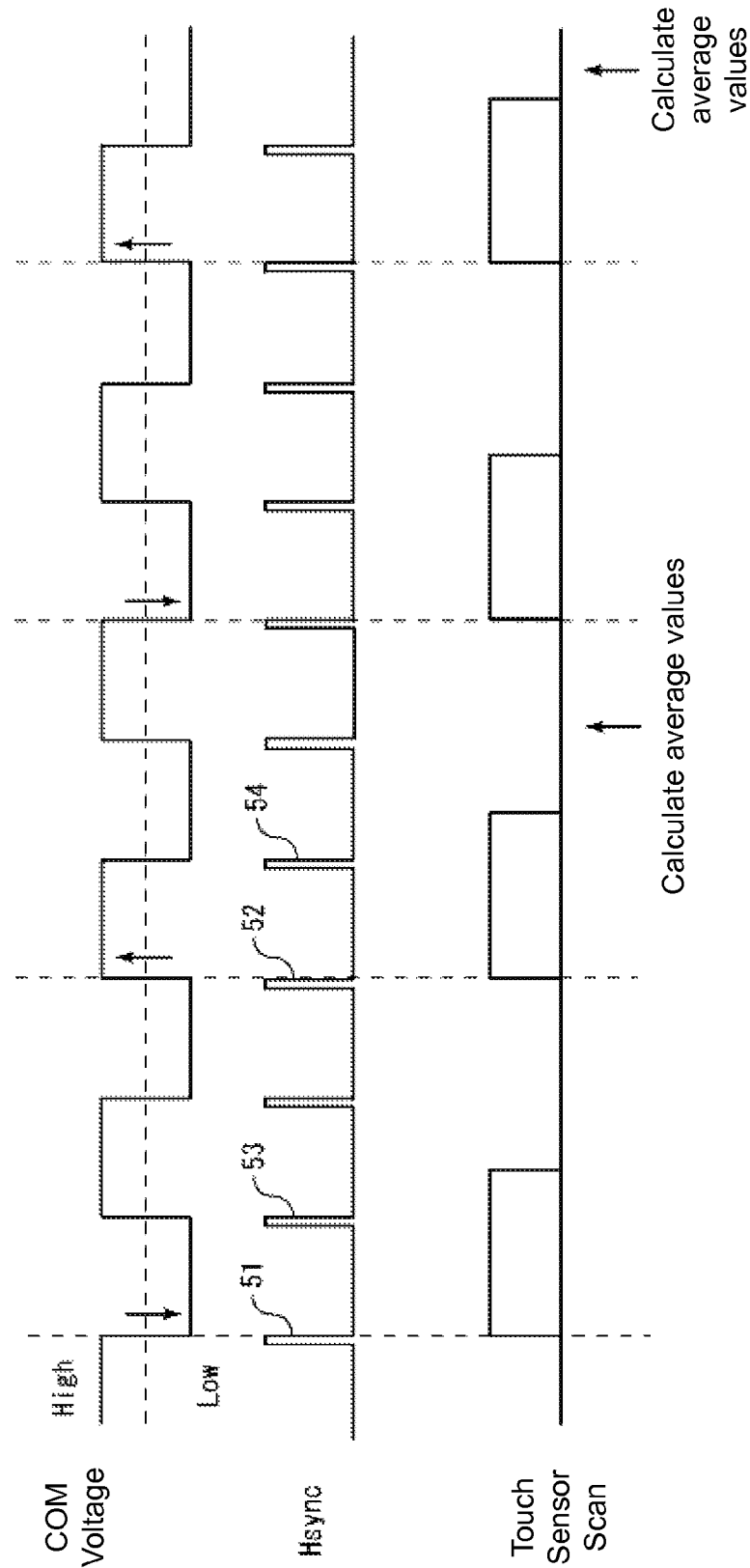
FIG. 7 is a timing chart that shows a timing of a scanning operation and an average value calculation operation in the touch sensor circuit according to Embodiment 1.

As shown in FIG. 3, the polarity of the common voltage reverses from positive to negative or from negative to positive in synchronization with the fall (a switch from high level to low level) of the horizontal synchronization signal ($H_{SYNC}$). In the present embodiment, the scanning operation for the sensor electrodes in the touch sensor part 7 starts in synchronization with the fall of the horizontal synchronization signal, as shown in FIG. 7. The scanning operation will be explained in detail later.

When the polarity of the common voltage supplied to the opposite electrode 5 switches in this manner from positive to negative or from negative to positive, an induced voltage is generated in the touch sensor part 7, becoming a noise component in the touch sensor output.

Figure 4A:
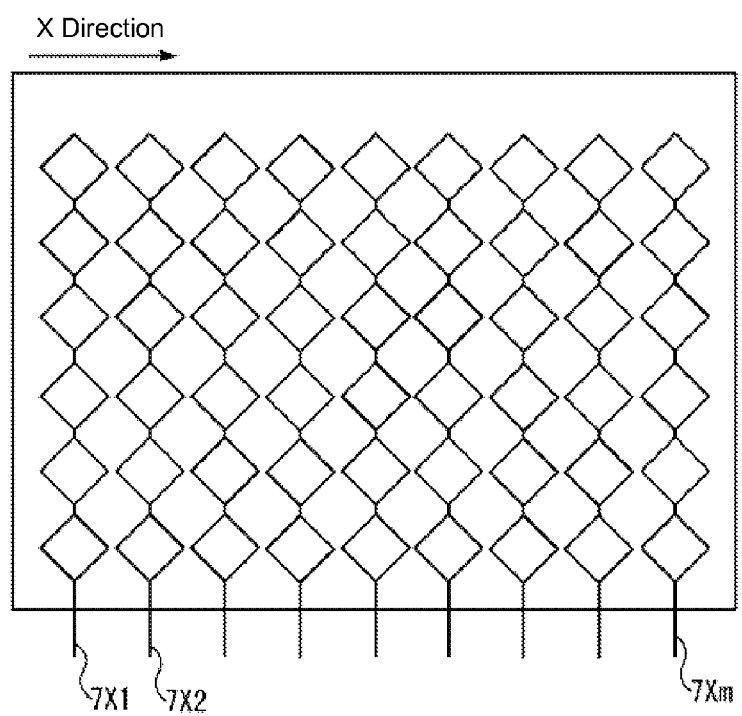
FIG. 4A is a schematic drawing that shows only transparent conductive films for detecting a touch position in an X direction among the transparent conductive films of the touch sensor part, and shows an example of a configuration thereof.
Figure 4B:
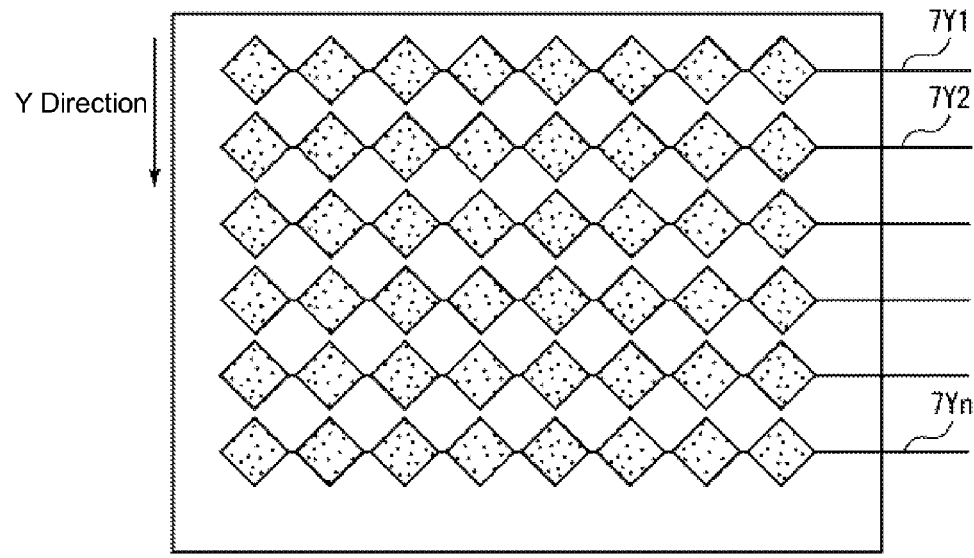
FIG. 4B is a schematic drawing that shows only the transparent conductive films for detecting a touch position in a Y direction among the transparent conductive films of the touch sensor part, and shows an example of a configuration thereof.
Figure 4C:
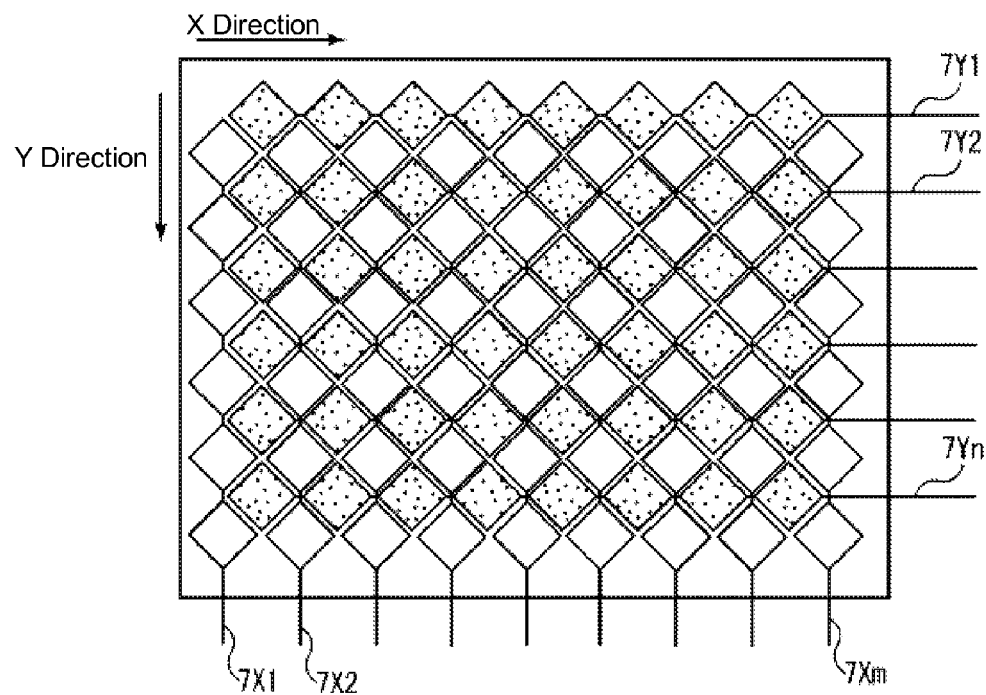
FIG. 4C is a schematic drawing that shows the configuration of all of the transparent conductive films of the touch sensor part.

Next, the configuration of the touch sensor part 7 according to the present embodiment and the driving operation thereof will be described in further detail. In the description below, the long-side direction of the touch sensor part 7 is the X direction and the direction perpendicular to that is the Y direction. FIG. 4A is a schematic drawing that shows only the transparent conductive films for detecting a touch position in the X direction, among the transparent conductive films of the touch sensor part 7, and shows an example of a configuration thereof. FIG. 4B is a schematic drawing that shows only the transparent conductive films for detecting a touch position in the Y direction, among the transparent conductive films of the touch sensor part 7, and shows an example of a configuration thereof. FIG. 4C is a schematic drawing that shows the configuration of all of the transparent conductive films of the touch sensor part 7. In FIGS. 4B and 4C, a dotted pattern is used for the transparent conductive films for detecting the touch position in the Y direction in order to be easily distinguished from the transparent conductive films for detecting the touch position in the X direction. In other words, the actual transparent conductive films do not have such a pattern.

As shown in FIGS. 4A and 4B, the touch sensor part 7 has an "m" number of electrode patterns 7X1, 7X2, . . . 7Xm (first sensor electrode group) in the X direction and an "n" number of electrode patterns 7Y1, 7Y2, . . . 7Yn (second sensor electrode group) in the Y direction. In FIG. 4A and the like, the drawings are simplified for ease of description but the actual number of electrode patterns (m, n) provided in the touch sensor part 7 is determined based on the sensor resolution needed for the touch sensor part 7. The touch sensor part 7 of the present embodiment determines the X coordinate of the touch position using the electrode patterns 7X1, 7X2, . . . 7Xm, and determines the Y coordinate of the touch position using the electrode patterns 7Y1, 7Y2, . . . 7Yn. Therefore, it is preferable for the electrode patterns to be arranged with a density such that when a contacting body such as a finger or a stylus comes into contact, the contacting body comes into contact with at least one of the X direction electrode patterns 7X1, 7X2, . . . 7Xm and at least one of the Y direction electrode patterns 7Y1, 7Y2, . . . 7Yn, simultaneously.

As shown in FIGS. 4A and 4B, each of the electrode patterns 7X1 to 7Xm and the electrode patterns 7Y1 to 7Yn are patterned as a plurality of rectangular conductive films that are connected in series via conductive wiring lines such that the corners of the respective rectangles face each other. The conductive wiring lines may be formed of the same material as the conductive films or of another conductive material. As shown in FIG. 4C, the conductive wiring lines are led to the outside of the touch sensor part 7 and connected to the sensor output read circuit, which will be described later.

In the example shown in FIG. 4C, the rectangular parts of the X direction electrode patterns 7X1, 7X2, . . . 7Xm and the rectangular parts of the Y direction electrode patterns 7Y1, 7Y2, . . . 7Yn are arranged so as not to overlap with each other. Also, at the intersection points between the conductive wiring lines of the electrode patterns 7X1, 7X2, . . . 7Xm and the conductive wiring lines of the electrode patterns 7Y1, 7Y2, . . . 7Yn, insulating films are interposed between the wiring lines so that the X direction conductive wiring lines and the Y direction conductive wiring lines are not electrically connected.

However, the configuration of the conductive films of the touch sensor part 7 is not limited to the example shown in FIG. 4C. A configuration in which the X direction electrode patterns and the Y direction electrode patterns overlap with each other may be used, for example. In this case, the X direction electrode patterns and the Y direction electrode patterns may be formed in different layers, sandwiching an insulating film layer. Alternatively, an insulating film may be interposed between the X direction electrode patterns and the Y direction electrode patterns, at least in locations where these patterns overlap.

Figure 5:
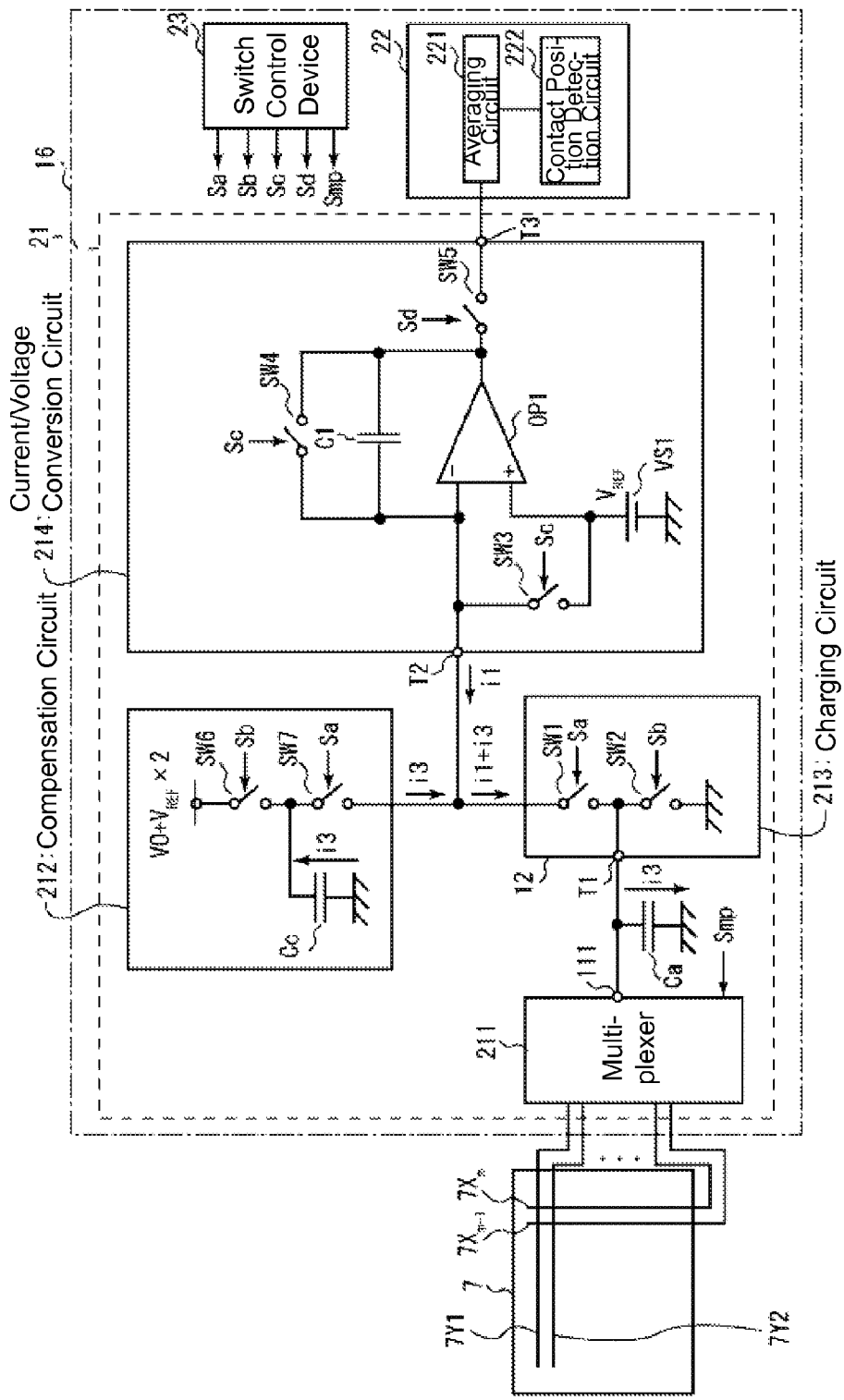
FIG. 5 is a circuit diagram that shows the internal configuration of a touch sensor circuit.

Next, the configuration of the touch sensor circuit 16 will be described. FIG. 5 is a circuit diagram that shows the internal configuration of the touch sensor circuit 16. As shown in FIG. 5, the touch sensor circuit 16 is provided with a sensor output read circuit 21, a coordinate calculation device 22, and a switch control device 23 (sensor control circuit).

The sensor output read circuit 21 outputs a signal representing the capacitance of the electrode patterns 7X1, 7X2, . . . 7Xm and the electrode patterns 7Y1, 7Y2, . . . 7Yn of the touch sensor part 7. The coordinate calculation device 22 finds the coordinates of the position where a contacting body has come into contact with the electrode patterns 7X1, 7X2, . . . 7Xm and the electrode patterns 7Y1, 7Y2, . . . 7Yn, based on the output signal value from the sensor output read circuit 21. The switch control device 23 controls the operation of the sensor output read circuit 21 by supplying control signals to the various types of switches and the like of the sensor output read circuit 21.

The sensor output read circuit 21 is provided with a multiplexer 211, a compensation circuit 212, a charging circuit 213 and a current/voltage conversion circuit 214.

The multiplexer 211 connects the outputs from the electrode patterns 7X1, 7X2, . . . 7Xm and the electrode patterns 7Y1, 7Y2, . . . 7Yn of the touch sensor part 7 to the charging circuit 213 selectively and sequentially one at a time. In other words, the multiplexer 211 divides one sensor cycle into m+n periods and selects one electrode pattern per period. The selection of the electrode pattern by the multiplexer 211 is controlled using a selection signal Smp supplied from the switch control device 23.

The charging circuit 213 is provided with switching elements SW1 and SW2. The switching element SW1 switches between connecting and disconnecting a terminal T1 of the charging circuit 213 to the current/voltage conversion circuit 214. The switching element SW2 switches between connecting and disconnecting the terminal T1 to the ground voltage. The switching done by the switching elements SW1 and SW2 is controlled using control signals Sa and Sb supplied from the switch control device 23.

The compensation circuit 212 is provided with a capacitor Cc and switching elements SW6 and SW7. The switching element SW6 switches between connecting and disconnecting one terminal of the capacitor Cc to a power source terminal to which a voltage $(V_0+V_{REF}\times 2)$ is applied. The switching element SW7 switches between connecting and disconnecting one terminal of the capacitor Cc to the switching element SW1 of the charging circuit 213. The other terminal of the capacitor Cc is maintained at ground potential. The capacitance of the capacitor Cc is set to the same capacitance as a parasitic capacitance Ca formed between the electrode patterns of the touch sensor 7 and the terminal T1 of the charging circuit 213. The compensation circuit 212 compensates for a current i3 flowing to the parasitic capacitance Ca by supplying an equal size current i3 to the touch sensor 7 via the switching element SW1.

The current/voltage conversion circuit 214 is provided with a capacitor C1, a differential amplifier OP1, and switching elements SW3, SW4 and SW5. The capacitor C1 functions as a charge storage part for storing charge. One terminal of the capacitor C1 is connected to one of two input terminals of the differential amplifier OP1. The other input terminal of the differential amplifier OP1 is connected to a power source terminal Vs1 to which a voltage $V_{REF}$ is applied. The other terminal of the capacitor C1 is connected to the output terminal of the differential amplifier OP1.

The switching element SW3 switches between connecting and disconnecting the terminal of the capacitor C1, which is connected to the input terminal of the differential amplifier OP1, to the power source terminal Vs1 to which the voltage $V_{REF}$ is applied. The switching element SW4 switches between connecting and disconnecting the two terminals of the capacitor C1. The switching done by the switching elements SW3 and SW4 is controlled by a control signal Sc supplied from the switch control device 23.

The switching element SW5 switches between connecting and disconnecting the output terminal of the differential amplifier OP1 to the coordinate calculation device 22. The switching done by the switching element SW5 is controlled by a control signal Sd supplied from the switch control device 23.

The coordinate calculation device 22 is provided with an averaging circuit 221 and a contact position detection circuit 222 (coordinate position detection circuit). The averaging circuit 221 determines the average values between output signal values obtained through a plurality of scans by the sensor output read circuit 21, as will be described in detail later. The contact position detection circuit 222 calculates the coordinates of the position where a stylus, a finger, or the like has come into contact based on the average values found by the averaging circuit 221.

The coordinate position detection operation by the touch sensor circuit 16 will be described below.

First, the switch control device 23 sets the switching elements SW2, SW3, SW4, and SW6 to the ON state, and sets the switching elements SW1, SW5, and SW7 to the OFF state. In this state, the voltage of the terminal 111 is set to $V_0$ (ground voltage) and the difference in potential between the two terminals of the capacitor Cc is set to $V_0+2V_{REF}$. Also, both terminals of the capacitor C1 are set to the same voltage $V_{REF}$. At this time, the difference in potential between the two terminals of the capacitor C1 is 0V.

Next, the switch control device 23 sets the switching elements SW1, SW5, and SW7 to the ON state and sets the switching elements SW2, SW3, SW4, and SW6 to the OFF state. In this state, the capacitor C1 is connected to an electrode pattern selected by the multiplexer 211 among the electrode patterns in the touch sensor part 7. At this time, if a contacting body such as a finger or a stylus is in contact with the electrode pattern, a current flows to the contacting body, and the amount of charge stored in the capacitor C1 changes. At this time, the current i3 flowing to the parasitic capacitance Ca is compensated by an equal size current i3 flowing from the capacitor Cc. The differential amplifier OP1 outputs a voltage signal corresponding to the amount of charge stored in the capacitor C1. As a result, the terminal T3 of the current/voltage conversion circuit 214 outputs signals of different voltages depending on whether or not a contacting body is in contact with the electrode patterns of the touch sensor part 7 and the difference in permittivity or the like of the contacting body.

Therefore, the coordinate calculation device 22 can detect whether or not a contacting body is in contact with the electrode patterns of the touch sensor part 7 based on the output signal from the terminal T3 of the current/voltage conversion circuit 214. The value of an output signal from the terminal T3 of the current/voltage conversion circuit 214 when nothing is in contact with the electrode patterns of the touch sensor part 7 can be calculated in advance and stored, for example, and by comparing that value and the output signal value, it can be determined whether or not a contacting body is in contact with the electrode patterns.

The coordinate calculation device 22 is provided with a memory (not shown in drawings) that stores the value of the output signal from the terminal T3 of the current/voltage conversion circuit 214. As described before, the multiplexer 211 sequentially selects a total of m+n electrode patterns including the X direction electrode patterns 7X1, 7X2, . . . 7Xm and the Y direction electrode patterns 7Y1, 7Y2, . . . 7Yn, during one sensor cycle (one scan). As a result, during one sensor cycle, m+n signal values are obtained as output signals from the terminal T3 of the current/voltage conversion circuit 214. The coordinate calculation device 22 detects the contact position of a contacting body based on the m+n signal values. If it is determined that a contacting body is in contact with the electrode pattern 7X1 out of the X direction electrode patterns 7X1, 7X2 . . . 7Xm and the Y direction electrode pattern 7Y1, for example, then it can be determined that a finger, a stylus, or the like is in contact with the vicinity of the intersection point between the X direction electrode pattern 7X1 and the Y direction electrode pattern 7Y1. The number of contact points detected during one sensor cycle is not limited to one.

Figure 6:
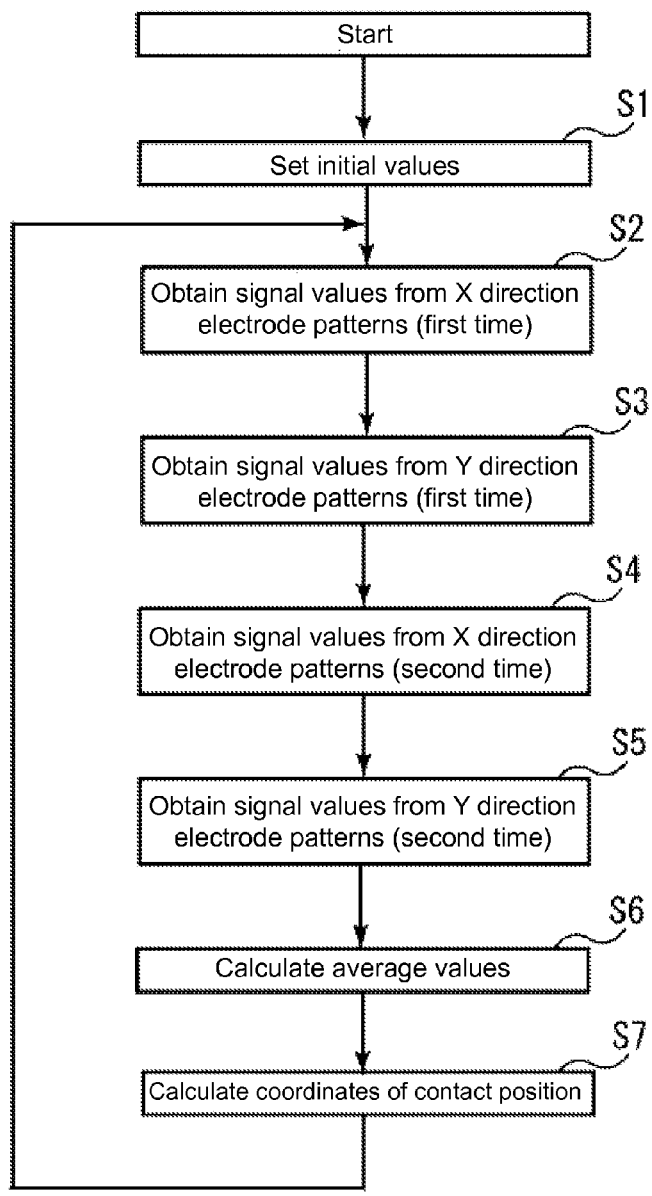
FIG. 6 is a flow chart that shows one example of an operation of the touch sensor circuit.

Next, the driving operation of the display panel 10 and the driving operation of the touch sensor part 7 in the touch sensor-equipped display device 20 according to the present embodiment will be described. FIG. 6 is a flow chart that shows one example of an operation of the touch sensor circuit 16.

As shown in FIG. 6, the operation of the touch sensor circuit 16 is started by turning the power source ON. First, various initial values are set (step S1).

Next, in the sensor output read circuit 21, the multiplexer 211 sequentially selects the X direction electrode patterns 7X1, 7X2, . . . 7Xm according to the control signal Smp from the switch control device 23. As a result, an "m" number of output signal values based on the capacitance of the respective electrode patterns are obtained (step S2) by sequentially connecting the electrode patterns to the charging circuit 213. The "m" output signal values obtained in step S2 are stored in an internal or external memory (not shown in drawings) of the coordinate calculation device 22 as X direction data obtained in a first scan. The switch control device 23 starts the selection of electrode patterns using the multiplexer 211 in synchronization with the fall (switching from high level to low level) of one pulse 51 of the horizontal synchronization signal $H_{SYNC}$, as shown in FIG. 7.

The multiplexer 211 then sequentially selects the Y direction electrode patterns 7Y1, 7Y2, . . . 7Yn according to the control signal Smp from the switch control device 23. As a result, an "n" number of output signal values based on the capacitance of the respective electrode patterns are obtained (step S3) by sequentially connecting the electrode patterns to the charging circuit 213. The "n" number of output signal values obtained in step S3 are stored in the internal or external memory (not shown in drawings) of the coordinate calculation device 22 as Y direction data obtained in the first scan.

Next, the multiplexer 211 sequentially selects the X direction electrode patterns 7X1, 7X2, . . . 7Xm again according to the control signal Smp from the switch control device 23. As a result, an "m" number of output signal values based on the capacitance of these electrode patterns are obtained (step S4). The "m" number of output signal values obtained in step S4 are stored in the internal or external memory (not shown in drawings) of the coordinate calculation device 22 as X direction data obtained during a second scan. As shown in FIG. 7, in the second scan, the switch control device 23 starts the selection of electrode patterns using the multiplexer 211 in synchronization with the fall of an odd numbered pulse 52 (the third pulse in the example shown in FIG. 7) counting from the pulse 51, which is a trigger for the scan in step S2 to start.

The multiplexer 211 then sequentially selects the Y direction electrode patterns 7Y1, 7Y2, . . . 7Yn according to the control signal Smp from the switch control device 23. As a result, an "n" number of output signal values based on the capacitance of these electrode patterns are obtained (step S5). The "n" number of output signal values obtained in step S5 are stored in the internal or external memory (not shown in drawings) of the coordinate calculation device 22 as Y direction data obtained in the second scan.

As a result of the steps S2 to S5, an m+n number of output signal values obtained in the first scan and an m+n number of output signal values obtained in the second scan are stored in the memory.

Next, in the coordinate calculation device 22, the averaging circuit 221 reads out the data stored in the memory, and determines respective averages of the m+n number of output signal values obtained in the first scan and the m+n number of output signal values obtained in the second scan (step S6). In other words, the coordinate calculation device 22 determines an average value of the output signal values obtained during the first scan and the output signal values obtained during the second scan for each of the electrode patterns 7X1, 7X2, . . . 7Xm and the electrode patterns 7Y1, 7Y2, . . . 7Yn, respectively.

Next, in the coordinate calculation device 22, the contact position detection circuit 222 compares the average values determined in step S6 with a prescribed threshold value, thus determining the coordinates of the position where a contacting body is in contact (step S7). Here, the prescribed threshold value is a value obtained by adding a margin, if necessary, to the output signal value of the sensor output read circuit 21 obtained when nothing is in contact with the electrode patterns, for example.

The process of respectively storing the output signal values obtained in an odd numbered scan and the output signal values obtained in an even numbered scan in the memory in steps S2 to S5, deriving the average values thereof in step S6, and finding the coordinates of the contacted position in step S7 is repeated.

Through the above process, the touch sensor circuit 16 repeatedly obtains the m+n number of output signal values based on the capacitance of the electrode patterns 7X1, 7X2, . . . 7Xm, 7Y1, 7Y2, . . . 7Yn, with three periods of the horizontal synchronization signal $H_{SYNC}$ being counted as one period as shown in FIG. 7. The averaging circuit 221 determines the average values of the output signal values obtained during each scan, every two scans. The common voltage (COM voltage) supplied to the opposite electrode 5 switches from positive polarity to negative polarity when the pulse 51 of the horizontal synchronization signal $H_{SYNC}$ falls. When the pulse 52 falls, the common voltage polarity switches from negative to positive.

Therefore, in the present embodiment, the first scan shown in FIG. 7 starts when the COM voltage is at negative polarity and the second scan starts when the COM voltage is at positive polarity. Therefore, the noise that the output signal values obtained during the first scan receive due to a polarity reversal of the COM voltage and the noise that the output signal values obtained during the second scan receive due to the polarity reversal of the COM voltage are at opposite polarity to each other. In the example of FIG. 7, for example, the COM voltage reverses from negative polarity to positive polarity in synchronization with a pulse 53 of the horizontal synchronization signal $H_{SYNC}$ during the first scanning operation. During the second scanning operation, the COM voltage reverses from positive polarity to negative polarity in synchronization with a pulse 54 of the horizontal synchronization signal $H_{SYNC}$. Therefore, by having the averaging circuit 221 determine the average values between the output signal values obtained during the first scan and the output signal values obtained during the second scan, the noise originating from the polarity reversal of the COM voltage can be cancelled out.

Embodiment 2

A touch sensor-equipped display device according to Embodiment 2 of the present invention will be described below with reference to the drawings. Where a configuration has the same functions as Embodiment 1, the same reference characters will be used, and detailed descriptions thereof will be omitted.

The configuration of the touch sensor-equipped display device according to Embodiment 2 is similar to the touch sensor-equipped display device 20 of Embodiment 1. However, in the touch sensor-equipped display device according to Embodiment 2, the operation of the touch sensor circuit 16 differs from that of Embodiment 1.

Figure 8:
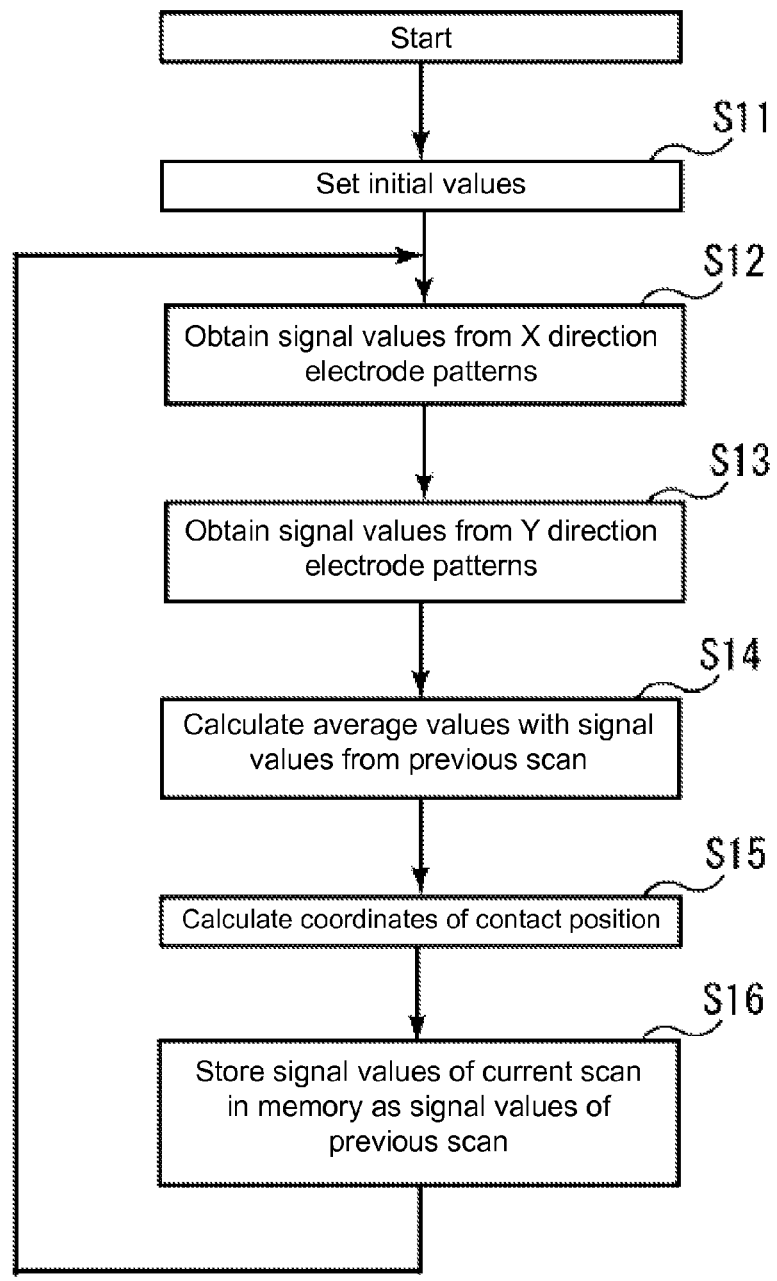
FIG. 8 is a flow chart that shows a modified example of an operation of a touch sensor circuit according to Embodiment 2.

FIG. 8 is a flow chart that shows a modified example of an operation of the touch sensor circuit 16 according to the present embodiment. As shown in FIG. 8, the operation of the touch sensor circuit 16 is started by turning the power source ON. First, various initial values are set (step S11). At this time, in the memory where the output signal values from the sensor output read circuit 21 are stored, the "output signal values obtained in the previous scan" from the respective electrode patterns are set to zero as initial values, for example.

Figure 9:
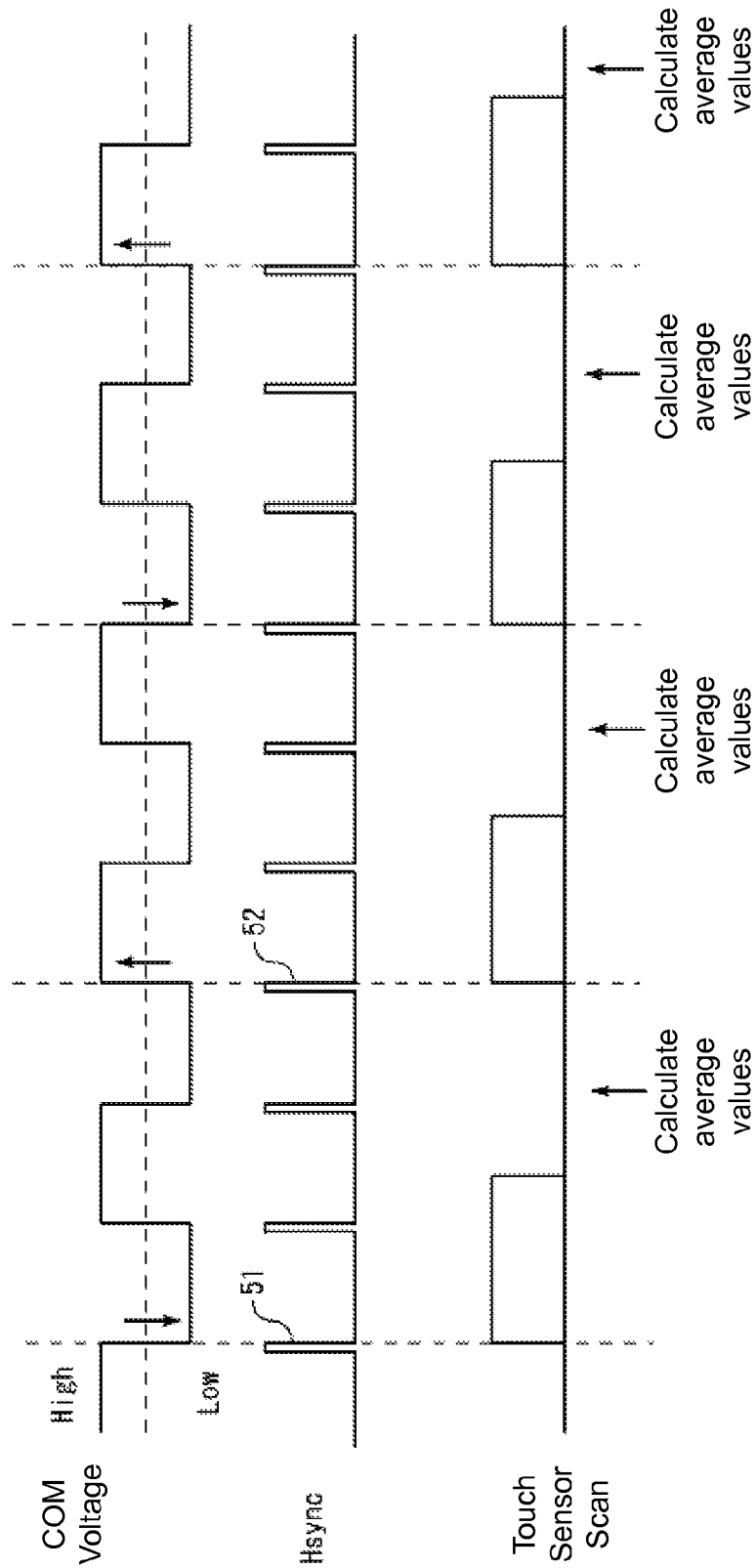
FIG. 9 is a timing chart that shows a timing of a scanning operation and an average value calculation operation in the touch sensor circuit according to Embodiment 2.

Next, the multiplexer 211 sequentially selects the X direction electrode patterns 7X1, 7X2, . . . 7Xm according to the control signal Smp from the switch control device 23. As a result, an "m" number of output signal values based on the capacitance of the electrode patterns are obtained (step S12). The "m" number of output signal values obtained in step S12 are stored in the internal or external memory (not shown in drawings) of the coordinate calculation device 22 as X direction data obtained in the current scan. The memory is provided with separate regions to store data obtained in the previous scan and data obtained in the current scan. As shown in FIG. 9, the switch control device 23 also starts selection of the electrode patterns using the multiplexer 211 in synchronization with the fall of the pulse 51 of the horizontal synchronization signal $H_{SYNC}$, in the present embodiment.

The multiplexer 211 then sequentially selects the Y direction electrode patterns 7Y1, 7Y2, . . . 7Yn according to the control signal Smp from the switch control device 23. As a result, an "n" number of output signal values based on the capacitance of the electrode patterns are obtained (step S13). The "n" number of output signal values obtained in step S13 are stored in the internal or external memory (not shown in drawings) of the coordinate calculation device 22 as Y direction data obtained in the current scan.

Next, the averaging circuit 221 of the coordinate calculation device 22 finds the average values between the output signal values obtained in the previous scan and the output signal values obtained in the current scan, referring to the memory (step S14).

The contact position detection circuit 222 of the coordinate calculation device 22 finds the coordinates of the position where a contacting body has come into contact by comparing the average values found in step S14 with a prescribed threshold value (step S15). Here, the prescribed threshold value is a value obtained by adding a margin, as necessary, to the output signal values from the sensor output read circuit 21 obtained when nothing is in contact with the electrode patterns, for example.

Next, the coordinate calculation device 22 stores the output signal values obtained in steps S12 and S13 in the memory as "output signal values obtained in the previous scan" (step S16).

Then, the steps S12 to S16 are repeated. From the second and following scans of step S12, the switch control device 23, as shown in FIG. 9, starts the selection of electrode patterns using the multiplexer 211 in synchronization with the fall of an odd numbered pulse 52 (the third pulse in the example of FIG. 9) counting from the pulse 51, which is a trigger for the start of the previous scan.

Therefore, when step S14 is first done, because "the output signal values obtained in the previous scan" from the respective electrode patterns were set to zero in the memory as a result of the initial value setting process in step S11, the output values from the averaging circuit 221 are the output signal values obtained in the current scan. When step S14 is done a second or following time, the output signal values actually obtained in the previous scan are stored in the memory. Therefore, by finding the average values of the output signal values obtained in the previous scan and the current scan, the noise originating from the polarity reversal of the COM voltage is cancelled out as described in Embodiment 1.

As shown in FIG. 9, in the configuration according to Embodiment 2, the average values of the output signal values obtained during the previous scan and the current scan are taken every time a scan is done in the touch sensor part 7, and the coordinates of the contacted position are determined based on these average values. Therefore, compared to the configuration according to Embodiment 1 shown in FIG. 7, the frequency of the coordinate detection of the contacted position in the touch sensor part 7 is doubled.

Embodiments of the present invention have been described above, but the above embodiments are mere examples of implementations of the present invention. The present invention is not limited to the above embodiments, and can be implemented by appropriately modifying the above embodiments without departing from the spirit thereof.

In the above description, for example, an example of a configuration was shown in which a contacted position is detected by utilizing a change in the capacitance of the electrode patterns as a result of a finger, a stylus, or the like coming into contact therewith. However, the configuration of the touch sensor part is not limited to such a capacitance coupling type, and other appropriate types may be used. The present invention is not limited to a touch-type sensor, and can also be applied to a sensor that electrically or optically detects an approach of a finger, a stylus, or the like.

In the above description, an example of a configuration was shown in which electrode patterns 7X1, 7X2, . . . 7Xm and electrode patterns 7Y1, 7Y2, . . . 7Yn are sequentially selected during one sensor cycle using one multiplexer. In other words, in the above description, an example of a configuration was shown in which the touch sensor circuit 16 is provided with one sensor output read circuit 21. However, a configuration in which a sensor output read circuit 21 is provided for each of the electrode patterns 7X1, 7X2, . . . 7Xm and the electrode patterns 7Y1, 7Y2, . . . 7Yn may be used. According to this configuration, it is possible to simultaneously scan the electrode patterns 7X1, 7X2, . . . 7Xm and the electrode patterns 7Y1, 7Y2, . . . 7Yn.

In the embodiments above, the case where the average was taken for the output signal values obtained as a result of two scanning operations has been described as an example, but the number of scanning operations to be averaged is not limited to two. An average may be taken from output signal values obtained in four scanning operations, for example.

INDUSTRIAL APPLICATION

The present invention has industrial applicability as a touch sensor-equipped display device.

The invention claimed is:

1. A touch sensor-equipped display device, comprising:
   a display panel that includes an active matrix substrate having a plurality of pixel electrodes formed therein, a display medium layer, and an opposite substrate having an opposite electrode that faces the plurality of pixel electrodes;
   a display panel driver circuit that supplies a display signal voltage to the plurality of pixel electrodes, the display panel driver circuit also supplying a common voltage, which undergoes a periodic reversal of polarity, to the opposite electrode;
   a touch sensor part disposed on a surface of the display panel on a side of the opposite substrate, the touch sensor part having a plurality of sensor electrodes that exhibit a change in electrical characteristics when a contacting body comes into contact therewith;
   a sensor output read circuit that is sequentially connected to the respective sensor electrodes, the sensor output read circuit outputting a signal voltage based on the electrical characteristic of the connected sensor electrode;
   a sensor control circuit that supplies a control signal to the sensor output read circuit; and
   a coordinate calculation circuit that detects a position where the contacting body has come into contact in the touch sensor part based on the signal voltage outputted from the sensor output read circuit,
   wherein the sensor control circuit starts a scanning operation that sequentially connects each of the sensor electrodes in the touch sensor part to the sensor output read circuit to output the signal voltage, in synchronization with a horizontal synchronization signal supplied to the display panel driver circuit, and
   wherein the coordinate calculation circuit comprises:
   an averaging circuit that calculates an average value between a signal voltage value that is outputted from the sensor output read circuit through the scanning operation started in synchronization with a horizontal synchronization signal at which the common voltage reverses from negative polarity to positive polarity, and a signal voltage value that is outputted from the sensor output read circuit through the scanning operation started in synchronization with a horizontal synchronization signal at which the common voltage reverses from positive polarity to negative polarity; and
   a coordinate position detection circuit that detects a position where the contacting body has come into contact in the touch sensor part based on said average value.

2. The touch sensor-equipped display device according to claim 1, wherein the averaging circuit calculates an average value between a signal voltage value outputted from the sensor output read circuit through the scanning operation started in synchronization with one horizontal synchronization signal, and a signal voltage value outputted from the sensor output read circuit through the scanning operation started in synchronization with an odd numbered horizontal synchronization signal from said one horizontal synchronization signal.

3. The touch sensor-equipped display device according to claim 2, wherein the averaging circuit calculates the average value every two periods of the scanning operation.

4. The touch sensor-equipped display device according to claim 2, wherein the averaging circuit calculates the average value every one period of the scanning operation.

5. The touch sensor-equipped display device according to claim 1, wherein the sensor electrodes comprises a first sensor electrode group constituted of a plurality of sensor electrodes lined up in a first axis direction of coordinates in the touch sensor part, and a second sensor electrode group constituted of a plurality of sensor electrodes lined up in a second axis direction of the coordinates in the touch sensor part, and wherein the coordinate calculation circuit determines the first axis direction coordinate of the position where the contacting body has come into contact, based on a signal voltage outputted when the sensor output read circuit is connected to a sensor electrode belonging to the first sensor electrode group, and determines the second axis direction coordinate of the position where a contacting body has come into contact, based on a signal voltage outputted when the sensor output read circuit is connected to a sensor electrode belonging to the second sensor electrode group.

6. The touch sensor-equipped display device according to claim 1, wherein the polarity of the common voltage reverses every one horizontal period.

7. The touch sensor-equipped display device according to claim 1, wherein the polarity of the common voltage reverses every two horizontal periods.

* * * * *